United States Patent
Mestdagh et al.

[11] Patent Number: 5,299,293
[45] Date of Patent: Mar. 29, 1994

[54] PROTECTION ARRANGEMENT FOR AN OPTICAL TRANSMITTER/RECEIVER DEVICE

[75] Inventors: Denis J. G. Mestdagh, Brussels; Ingrid Z. B. Van de Voorde, Dilbeek, both of Belgium

[73] Assignee: Alcatel N.V., Amsterdam, Netherlands

[21] Appl. No.: 857,572

[22] Filed: Mar. 27, 1992

[30] Foreign Application Priority Data

Apr. 2, 1991 [BE] Belgium .............................. 09100303

[51] Int. Cl.⁵ .............................................. H04B 10/08
[52] U.S. Cl. ..................................... 359/110; 359/117; 359/128; 371/8.2; 370/16
[58] Field of Search ................ 359/110, 117, 125, 128, 359/133, 157, 161, 177, 187, 194; 370/16; 375/38; 371/8.2

[56] References Cited

U.S. PATENT DOCUMENTS

| | | | |
|---|---|---|---|
| 4,071,700 | 1/1978 | Huffman et al. | 179/15 |
| 4,234,956 | 11/1980 | Adderley et al. | 375/38 |
| 4,696,060 | 9/1987 | Oswald | 359/177 |
| 4,887,309 | 12/1989 | Andersson et al. | 359/110 |
| 5,091,796 | 2/1992 | Nishimura et al. | 359/110 |

FOREIGN PATENT DOCUMENTS 2598573 11/1987 France .
2233851 1/1991 United Kingdom .

OTHER PUBLICATIONS

Wu et al., "Decreasing Survivable Fiber Network Cost Using Optical Switches", GLOBECOM '88, IEEE Global Telecommunications Conference & Exhibition, Conference Record, pp. 93-97, vol. 1, Nov. 28-Dec. 1, 1988.
DIALOG English Language Abstract of FR 2 598 573.

Primary Examiner—Richard E. Chilcot, Jr.
Assistant Examiner—K. Negash
Attorney, Agent, or Firm—Spencer, Frank & Schneider

[57] ABSTRACT

A protection arrangement protects an optical transmitter device with n optical transmit circuits or an optical receiver device with n optical receive circuits. It includes fault evaluating circuitry to detect a defective transmit/receive circuit, a spare transmit/receive circuit, and switching circuitry. Upon detection of a defective transmit/receive circuit by the fault evaluating circuitry, the fault evaluation circuitry controls the spare transmit/receive circuit and the switching circuitry to bypass the defective transmit/receive circuit with the spare transmit/receive circuit.

12 Claims, 8 Drawing Sheets

PROTECTION ARRANGEMENT FOR AN OPTICAL TRANSMITTER/RECEIVER DEVICE

BACKGROUND OF THE INVENTION

1. Field of the Invention

The present invention relates to a protection arrangement for optical transmitter and receiver devices.

2. Background Information

Such an arrangement is already known in the art, e.g. from the article "Decreasing survivable fibre network cost using optical switches" by Tsong-Ho Wu et al, Globecom 88, IEEE Global Telecommunications Conference and Exhibition, Hollywood, Fla., Nov. 28–Dec. 1, 1988, Volume 1, page 3.6.2 second paragraph. Therein, a so-called 1:p protection circuit means that p working circuits are protected by 1 spare circuit, i.e. when one of the working circuits is defective it is replaced by the spare one. In this article the protection arrangement includes a 1:3 electronic protection circuit and the latter protects a transmitter/receiver device which consists of three communication branches each comprising an optical transmitter and receiver circuit interconnected by an optical cable. The protection circuit includes a transmitter and a receiver circuit interconnected by an optical cable. Whenever one of the transmitter circuits or one of the receiver circuits of the transmitter/receiver device becomes defective the complete communication branch, i.e. the transmitter circuit, the receiver circuits, as well as the connecting optical cable, are bypassed by and replaced by the protection circuit.

A drawback of this known arrangement is that even when only one of either the receiver circuit or the transmitter circuit is defective, the other correctly working transmitter or receiver circuit, as well as the optical cable, are replaced together with the defective circuit.

SUMMARY OF THE INVENTION

An object of the present invention is to provide a protection arrangement of the above type, but which does not present these drawbacks, i.e. which is more efficient.

According to the invention this object is achieved by the protection arrangement for an optical transmitter having n optical transmitter circuits whose outputs are coupled to respective output terminals, the protection arrangement including:

a spare optical transmit module connected to the optical transmitter circuits and having an output on which, if any of the optical transmitter circuits is defective, an optical signal characteristic for that defective circuit is produced, the optical signal carrying the same information as carried by an input signal applied to the input of the defective transmitter circuit; and routing means which are connected to the outputs of the optical transmitter circuits and to the output of the spare transmit module and which provide the optical signal at the output terminal to which the output of the defective optical transmit line circuit is coupled.

According to the invention this object is also achieved by the protection arrangement for an optical receiver device having n optical receive circuits whose outputs are coupled to respective ones of n output terminals, the protection arrangement including:

a spare optical receive module whose n inputs are constituted by the inputs of the optical receiver device, the spare optical receive module interworking with the optical receive circuits and having an output at which, if any one of the optical receive circuits is defective, an electrical signal characteristic of that defective optical receive circuit is produced, the electrical signal carrying the same information as carried by an input signal applied to the input of the defective optical receive circuit; and routing means which are connected to the outputs of the optical receive circuits and to the output of the spare optical receive module and which provide the electrical signal at the output terminal to which the output of the defective optical receive circuit is connected.

Hence the transmitter circuit as well as the receiver circuit are protected separately which is more efficient. Indeed, a defective transmitter circuit or a receiver circuit is thus replaced by the spare optical transmitter receiver circuit, respectively.

BRIEF DESCRIPTION OF THE DRAWINGS

The above mentioned and other objects and features of the invention will become more apparent and the invention itself will be best understood by referring to the following description of embodiments taken in conjunction with the accompanying drawings wherein.

DETAILED DESCRIPTION OF THE PREFERRED EMBODIMENTS

A definition and a more detailed description of the well-known optical elements constituting the described embodiments may be found in general literature concerning the optical field and is not, therefore, described herein.

Figure 1:
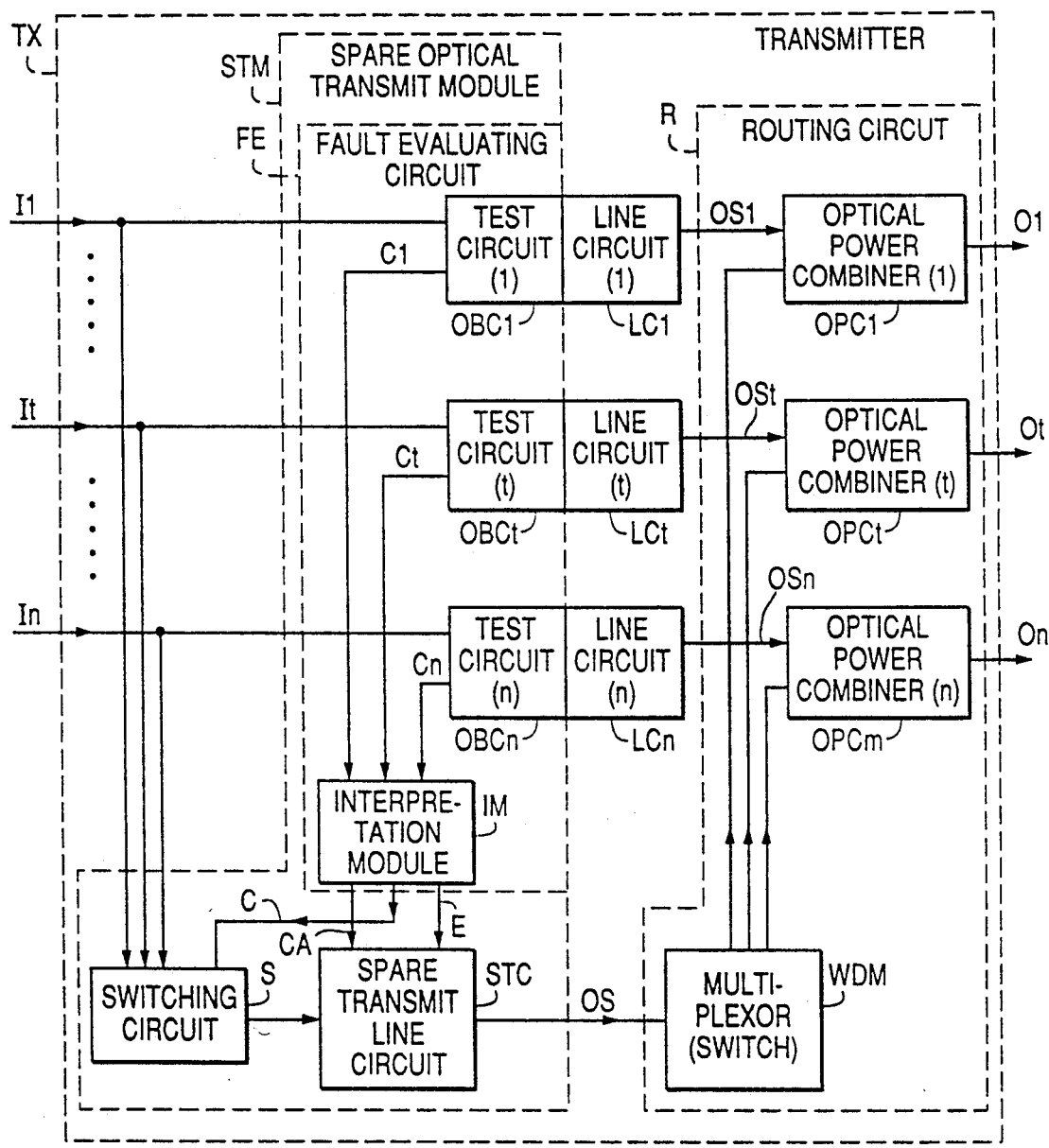
FIGS. 1, 5 and 6 show three embodiments in block diagram form of a protection arrangement for an optical transmitter device according to the invention.

Referring to FIG. 1 a 1:n protection arrangement for an optical transmitter device TX is described. This transmitter device is able to transmit packets of information for instance from a preceding switch to a receiver device coupled to a following switch through an optical fiber link of a switching system (all not shown).

The transmitter device TX has n input terminals I1/In to which respective electric signals I1/In are applied and n output terminals O1/On on which respective optical signals O1/On are provided as shown.

TX includes n optical transmitter circuits constituted by n optical transmit line circuits LC1/LCn and associated with a common protection arrangement comprising a spare optical transmit module STM and a routing circuit R. The value n, which is the number of circuits protected by the protection arrangement, is determined by the mean time between failure for the transmit line circuits, the mean time during which such a circuit is allowed to remain out of service, the time needed to repair a circuit, the dimensioning of the switching system, etc . . . A typical value for n is 16.

The inputs of the n optical transmit line circuits LC1/LCn are constituted by the input terminals I1/In. These circuits include lasers with respective fixed wavelengths l1/ln and produce at their outputs respective ones of n optical signals OS1/OSn which are fed to the routing circuit R and have these fixed wave lengths l1/ln respectively. Such optical transmitter line circuits are well known in the art and are therefore not described in more detail herein.

The spare optical transmit module STM comprises a switching circuit S, in particular an n-to-1 switch whose n inputs are connected to the inputs of the optical transmit line circuits LC1/LCn, a tunable spare transmit line circuit STC whose input is connected to the output of the n-to-1 switch S, and a fault evaluating circuit FE controlling the switch S as well as the spare transmit line circuit STC. Apart from including a tunable laser instead of a laser with fixed wavelength, the tunable spare transmit line circuit STC is identical to the optical transmit line circuits LC1/LCn.

The fault evaluating circuit FE includes n test circuits OBC1/OBCn which are part of the optical transmit line circuits LC1/LCn respectively. Each of these well known test circuits OBC1/OBCn transmits so called test cells to the associated optical transmit line circuit LC1/LCn to test the status thereof and provides test result signals C1/Cn indicative of their status, i.e. working or defective, a defective circuit being always put out of service. Each of these test result signals C1/Cn is a digital signal having the value 0 when the corresponding tested circuit is working correctly, or having the value 1 when this circuit is defective. The test results signals are applied to the n inputs of an interpretation module IM which is also part of the fault evaluating circuit FE. This interpretation module IM produces at its output a digital control signal C and an analog control signal CA indicating whether one of the optical transmit line circuits LC1/LCn is defective and identifying this defective line circuit. The digital control signal C is applied to a control input of the n-to-1 switch S and the analog control signal CA controls the tunable spare transmit line circuit STC to which an enable signal E, additionally provided by the interpretation module IM, is also fed.

Figure 2:
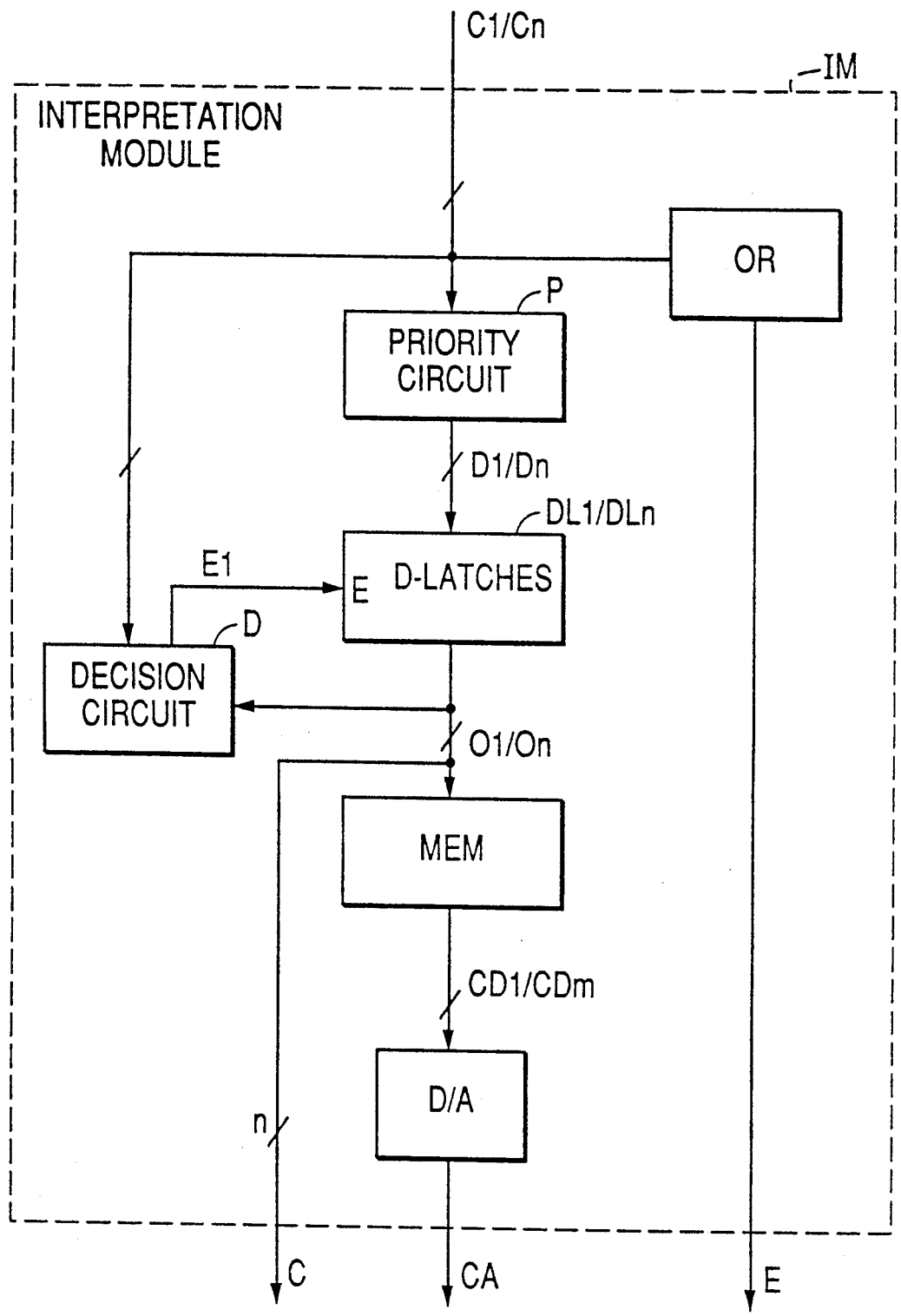
FIG. 2 represents in a more detailed block diagram the interpretation module IM of FIGS. 1 and 5.

The interpretation module IM which is represented in more detail in FIG. 2 comprises a priority circuit P. To the n inputs of the priority circuit P the n test result signals C1/Cn are applied. In response to these test result signals, the circuit P produces at its n outputs the n signals D1/Dn which are applied to n D-latches DL1/DLn, constituted by D-flipflops, each having an enable port E. These D-latches provide n output signals O1/On which are applied to the inputs of a decision circuit D and which together constitute the above mentioned digital control signal C. The decision circuit D has n additional inputs to which the signals C1/Cn are fed and one output E1 connected to the enable ports of the D-latches DL1/DLn. The signals O1/On are also applied to the address inputs of a memory MEM which in response generates m digital signals CD1/CDm at its output. These digital signals are converted to the above mentioned analog control signal CA in a digital-to-analog convertor D/A. The above test result signals C1/Cn are additionally applied to an OR gate which produces at its output the above mentioned enable signal E.

Figure 4:
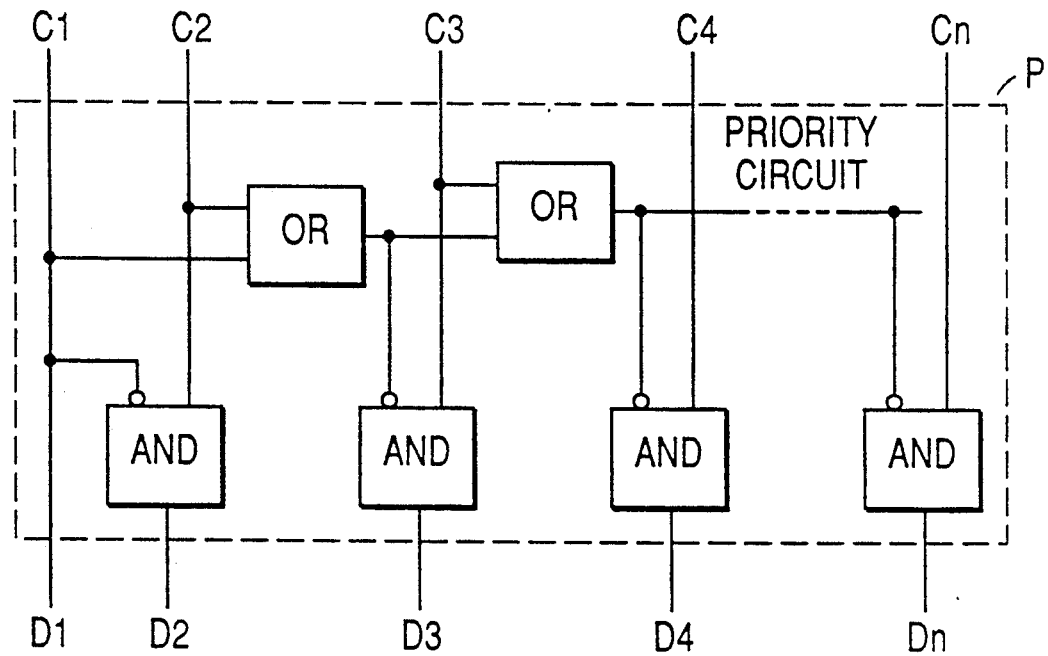

The priority circuit P makes sure that if several optical transmit line circuits become defective, i.e. when several test result signal go high (1), only the signal with the lowest sequence number is taken into account. For instance, when C1 and C2 are high (1) whereas C3/Cn are low (0), then D1 is high (1) and D2/Dn are low (0). Such a circuit can easily be realised by a person skilled in the art by means of logic circuitry. One possible embodiment is represented in FIG. 4 and its operation is self-explanatory.

Figure 3:
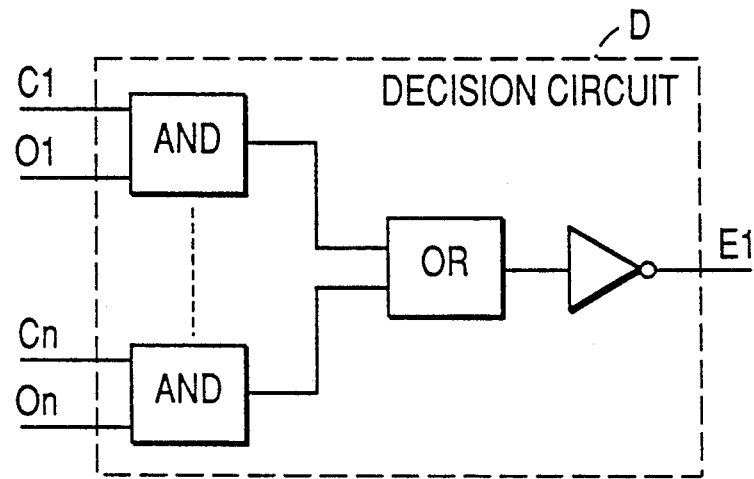
FIGS. 3 and 4 respectively represent the circuits D and P of FIG. 2 in a more detailed block diagram.

The signals D1/Dn are latched when the output signal E1 of the decision circuit D goes high (1). This circuit D makes sure that its output signal E1 is low—in order to disable the latches DL1/DLn —as long as one of the line circuits which was detected to be defective, remains defective, i.e., as long as one of the signals O1/On, and its corresponding one of the C1/Cn signals, stays high. Again such a decision circuit is easy to design by a person skilled in the art by means of logic circuitry. One possible embodiment is shown in FIG. 3 and is self-explanatory.

Thus, the signals O1/On indicate whether at least one of the optical transmit line circuits is defective and identifies the defective circuit with the lowest sequence number. Additionally, these signals represent the address of a location in the memory MEM where a digital value is stored indicative of the operating voltage which has to be applied to the tunable laser of the spare transmit line circuit STC in case of a defective optical transmit line circuit. More particularly, according to this address, the memory MEM produces at its output an m bit digital code word CD1/CDm indicative of this voltage value. This digital code word CD1/CDm is read by the digital-to-analog converter D/A and is converted to the analog signal CA. The gate OR generates an enable signal E which is suplied to the spare transmit line circuit STC (FIG. 1) thus enabling the STC circuit only when one of the optical transmit line circuits LC1/LCn is defective.

Again referring to FIG. 1, the routing circuit R of the optical transmitter device TX comprises an n-port wavelength demultiplexer WDM whose input is connected to the output of the tunable spare transmit line circuit STC, and n 2-by-1 optical power combiners OPC1/OPCn each of which has a first input connected to the output of a corresponding optical transmit line circuits LC1/LCn and a second input coupled to a corresponding one of n outputs of the n-port wavelength demultiplexer WDM. The outputs of the optical power combiners OPC1/OPCn constitute the output terminals O1/On of the optical transmitter device TX.

When one of the optical transmit line circuits, e.g., LCi, goes out of service or is put out of service while being defective, this is indicated by the condition (high) of the corresponding test result signal Ci and, therefore, also by the condition of the analog control signal CA, of the digital control signal C and of the enable signal E, produced by the interpretation module IM (FIG. 2) of the fault evaluating circuit FE. The digital control signal C controls the n-to-1 switch S in such a way that the switch S connects to its output the one of its inputs that is coupled to the defective optical transmit line circuit LCi. As a consequence, the input signal Ii is applied to the input of the tunable spare transmit line circuit STC enabled by the enable signal E. The analog control signal CA tunes the laser of the circuit STC, so that it produces at its output an optical signal OS with the proper wavelength li. Thus, the tunable spare transmit line circuit STC generates an optical signal OS identical to the signal OSi produced by the optical transmit line circuit LCi when it was working correctly. The n-port wavelength demultiplexer WDM, which is connected to the optical power combiners OPC1/OPCn, in response to the optical signal OS with wavelength li being applied to its input, routes this optical signal OSi to its output connected with one of the inputs of the optical power combiner OPCi. Since—as supposed—the defective optical transmit line circuit LCi connected to the other input of the optical power combiner OPCi is out of service, this optical power combiner generates at its output the optical signal OS.

The wavelength demultiplexer WDM could alternatively be replaced by a 1-to-n switch controlled by the digital control signal C to switch the input signal OS to the second input of the optical power combiner OPCi coupled to the defective line circuit LCi.

As described above, the protection arrangement is part of a coherent transmitter device, i.e., one wherein the transmitted optical signals OS1/OSn have different wavelengths l1/ln. As a consequence, the signal OS, produced by the spare optical transmit module STM when the optical transmit line circuit LCi is out of service, is identical to the signal OSi normally produced by that optical transmit line circuit LCi. This means that it has the same wavelength li and carries the same information. However, the protection arrangement is also applicable to intensity modulation/direction detection (IM/DD) systems, i.e. wherein all signals OS1/OSn have the same wavelength 10. In this case, the signal OS produced by the spare optical transmit module STM is possibly no longer identical to the optical signal OSi: it still carries the same information but may have a different wavelength li, in order to passively steer the wavelength demultiplexer WDM.

Preferably the wavelength li of the optical signal OS is chosen in the same wavelength window as the wavelength lo. The reason for this is related to the working of the corresponding receiving circuit which includes an optical detector transforming a received optical signal into an electric one. The optical detector reacts to optical signals with a wavelength laying within a well defined window. If the transmitter sent signals with a wavelength value outside that window, the optical detector would have to be tuned accordingly.

The above protection arrangement of FIG. 1 is effective only when a defective optical transmit line circuit is out of service or put out of service by the associated test circuitry (not shown).

Figure 5:
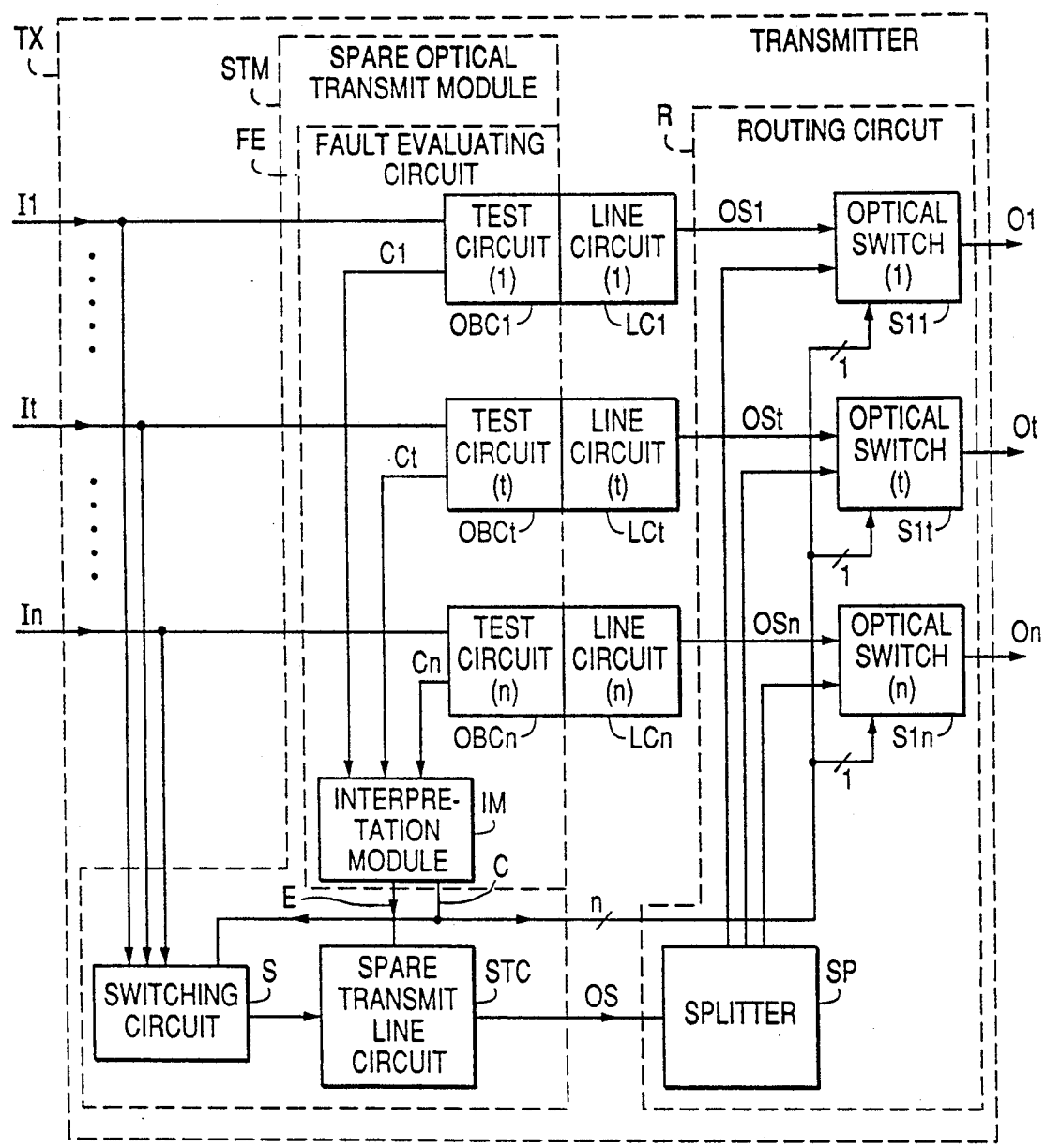

FIG. 5 represents a second embodiment of a protection arrangement for an optical transmitter according to the invention, but which is also effective when the defective optical transmit line circuit is not put out of service but continues working, producing faulty output signals. In this protection arrangement the routing circuit R comprises a passive 1-to-n splitter SP, with an input connected to the output of the spare transmit line circuit STC, and n 2-to-1 optical switches S11/S1n, each having a first signal input connected to the output of a respective one of the n optical transmit line circuits LC1/LCn, and a second signal input connected to a respective one of n outputs of the optical splitter SP. The optical switches S11/S1n further have control inputs, which are controlled by respective bits of the control signal C (splitting of the signal C in its respective bits is not shown in FIG. 5) in such a way that when one of the optical transmit line circuits, e.g. LCi, is defective, the corresponding 2-to-1 switch S1i is brought into a condition wherein its second input is connected to the corresponding output of the 1-to-n optical splitter SP. Thus, the optical signal OS is transferred to its output. The other switches pass to their output the output signal of the optical transmit line circuit they are connected with. In this way, even if the defective optical transmit line circuit LCi is still working, i.e., producing an output signal, its output signal OSi is not transmitted, but is replaced by the output signal OS of the spare transmit line circuit STC. It should be noted that the passive 1-to-n splitter SP may be replaced by an active 1-to-n switch controlled by the control signal C to reduce power losses and that, in the embodiment just described, there is no need for the spare transmit line circuit to be tunable since its output signal is fed to the second input of each of the 2-to-1 switches S11/S1n via the 1-to-n splitter SP.

Figure 6:
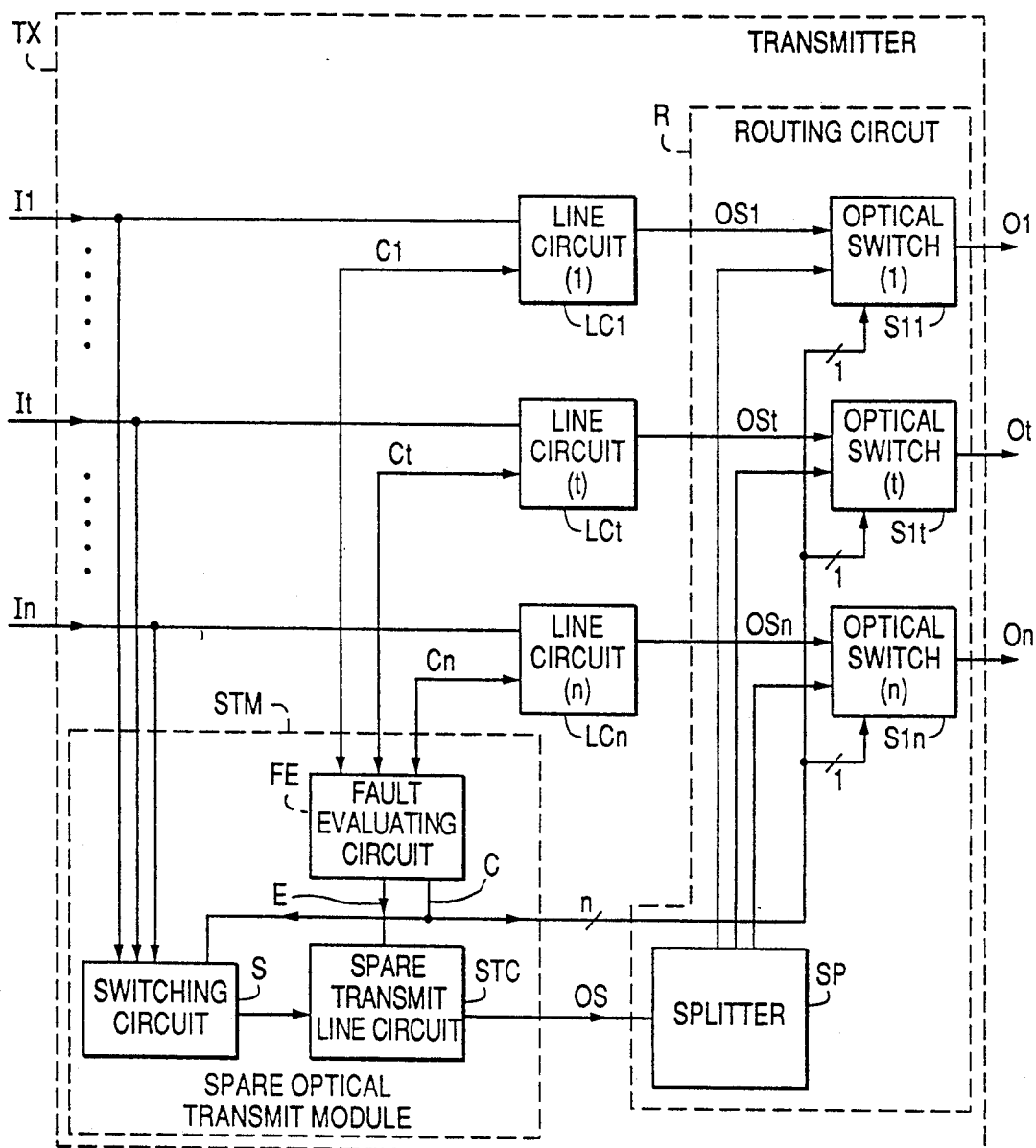

FIG. 6 represents a third embodiment of a protection arrangement for an optical transmitter device, according to the invention, similar to the one described above in relation to FIG. 5, but wherein the fault evaluating circuit FE is not part of the optical transmit line circuits LC1/LCn. This fault evaluating circuit FE comprises a controller (not shown) which, just like the test circuits OBC1/OBCn of FIGS. 1 and 5, applies test cells to the optical transmit line circuits LC1/LCn to check the working thereof, as well as an interpreter module (not shown) which, according to response cells received from the optical transmit line circuits, generates the control signal C and CA, and the enable signal E. The controller and the interpreter module which comprises FE are similar to the test circuits OBC1/OBCn and the interpretation module IM of FIGS. 1 and 5. However, they have additional processor logic to manage and coordinate the sending/receipt of the test/response cells to/from the n optical transmit line circuits LC1/LCn.

Figure 7:
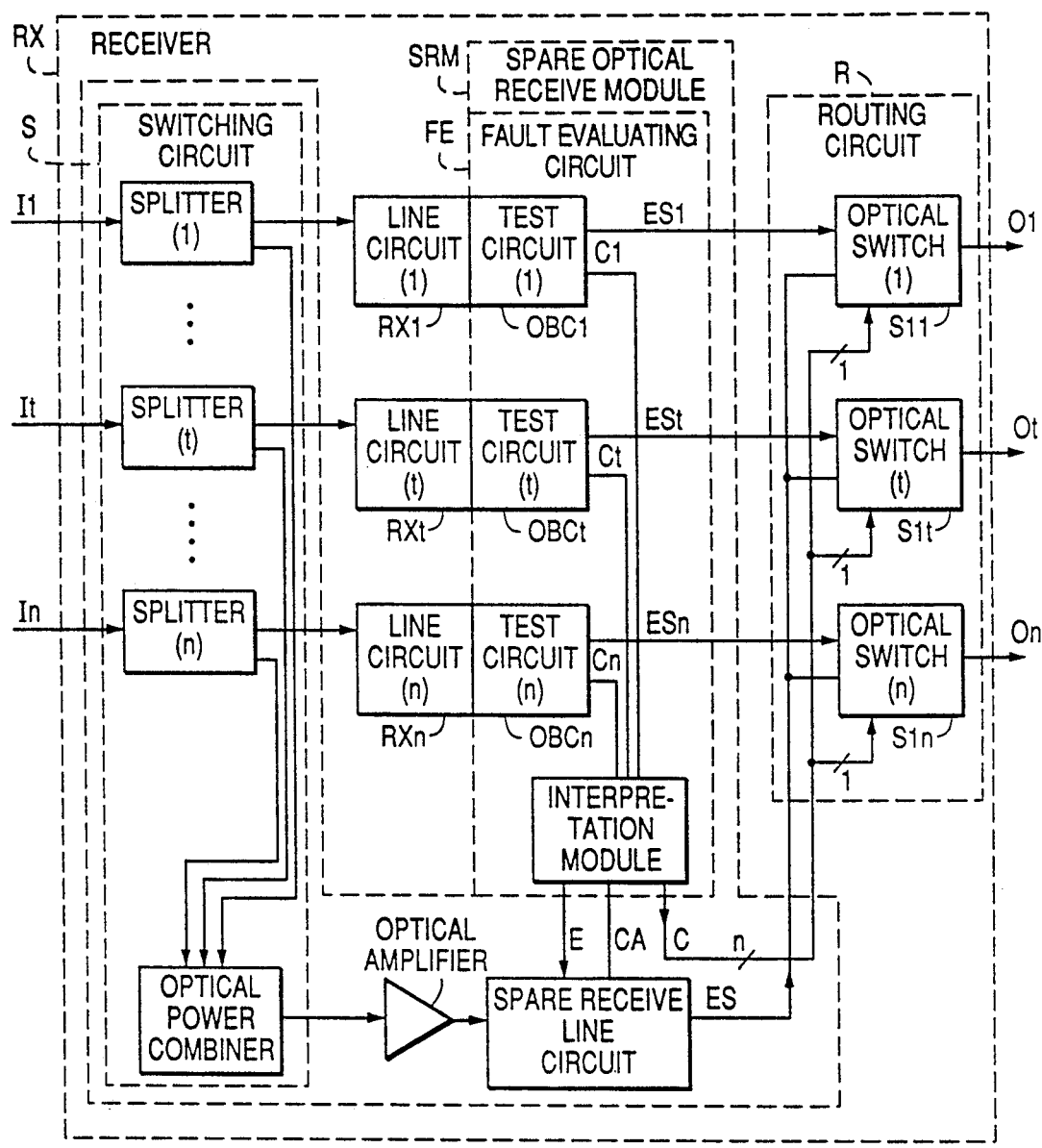
FIGS. 7 to 9 show embodiments in block diagram form of a protection arrangement for an optical receiver device according to the invention.

Referring to FIG. 7, a protection arrangement for a coherent receiver RX is now described. This receiver device has n input terminals I1/In to which respective optical signals I1/In, all having a different wavelength, are applied, and n output terminals O1/On on which respective electrical signals O1/On are provided. RX comprises n coherent optical receive circuits RX1/RXn which are coherent optical receive line circuits, a spare optical receive module SRM and a routing circuit R.

The input terminals I1/In are connected via the spare optical receive module SRM to the inputs of respective coherent optical receive line circuits RX1/RXn which produce at their outputs n electrical signals ES1/ESn that are fed to the routing circuit R. Such line circuits are, well known in the art and are therefore, not described in more detail herein.

The spare optical receive module SRM comprises a switching circuit S, an optical amplifier OA, a tunable spare receive line circuit SRC and a fault evaluating circuit FE. It should be noted that the optical amplifier is only needed when the signal received by the spare receive line circuit is too weak to activate the latter.

The switching circuit S includes n 1-to-2 optical splitters SP1/SPn, whose inputs are connected to the respective input terminals I1/In, and whose first outputs are coupled to the inputs of the respective coherent optical receive line circuits RX1/RXn. S also includes an n-to-1 optical power combiner OPC whose n inputs are connected to the second outputs of the optical splitters SP1/SPn, respectively, and whose output is connected to the optical amplifier OA.

The fault evaluating circuit FE is similar to the one described above with respect to the optical transmitter device T of FIG. 1 and has the same functionality. It includes n test circuits OBC1/OBCn which are part of the coherent optical receive line circuits RX1/RXn and produce respective test result signals C1/Cn indicative of the status, i.e., correctly working or defective, of these coherent optical receive line circuits. FE also includes an interpretation module IM to whose inputs the test result signals C1/Cn are applied and which produces at its outputs a digital control signal C and an analog control signal CA. These signals both indicate whether one of the coherent optical receive line circuits RX1/RXn is defective and also provide the identity of that defective circuit. The interpretation module IM additionally provides an enable signal E which is fed to the tunable spare receive line circuit SRC. The SRC is a well known tunable coherent optical detector which selects the desired wavelength under control of the analog signal CA and the enable signal E. An input of the SRC is connected to the output of the optical power combiner OPC through the optical amplifier OA.

The routing circuit R comprises n 2-to-1 switches S11/S1n, each of which has a first input connected to the output of a respective one of the coherent optical receive line circuits RX1/RXn, and a second input coupled to the output of the tunable spare receive line circuit SRC. S11/S1n are controlled by respective bits of the control signal C (the splitting of C in its different bits is not shown in FIG. 7) and their outputs are constituted by the output terminals O1/On.

When one of the coherent optical receive line circuits, e.g. RXi, is defective, this is indicated by the corresponding test result signal Ci being activated. As a consequence, the circuit IM produces an activated enable signal E which enables the operation of the tunable optical spare receive circuit SRC, and an activated control signal CA which controls the SRC in such a way that the SRC generates at its output an electric digital signal ES which is applied to the other inputs of all 2-to-1 switches S11/S1n. The control signal C controls the 2-to-1 switches so that S1i connects its second input to its output, whereas the other switches S11/S1i-1 and S1i+1/S1n remain in the position wherein their first input is connected to their output. In this way, the electrical signal ES produced by the spare optical receive module SRM is provided at the output Oi of the receiver circuit RX when the coherent optical receive line circuit RXi is defective. The other line circuits then provide their normal electrical signals at the other outputs.

Figure 8:
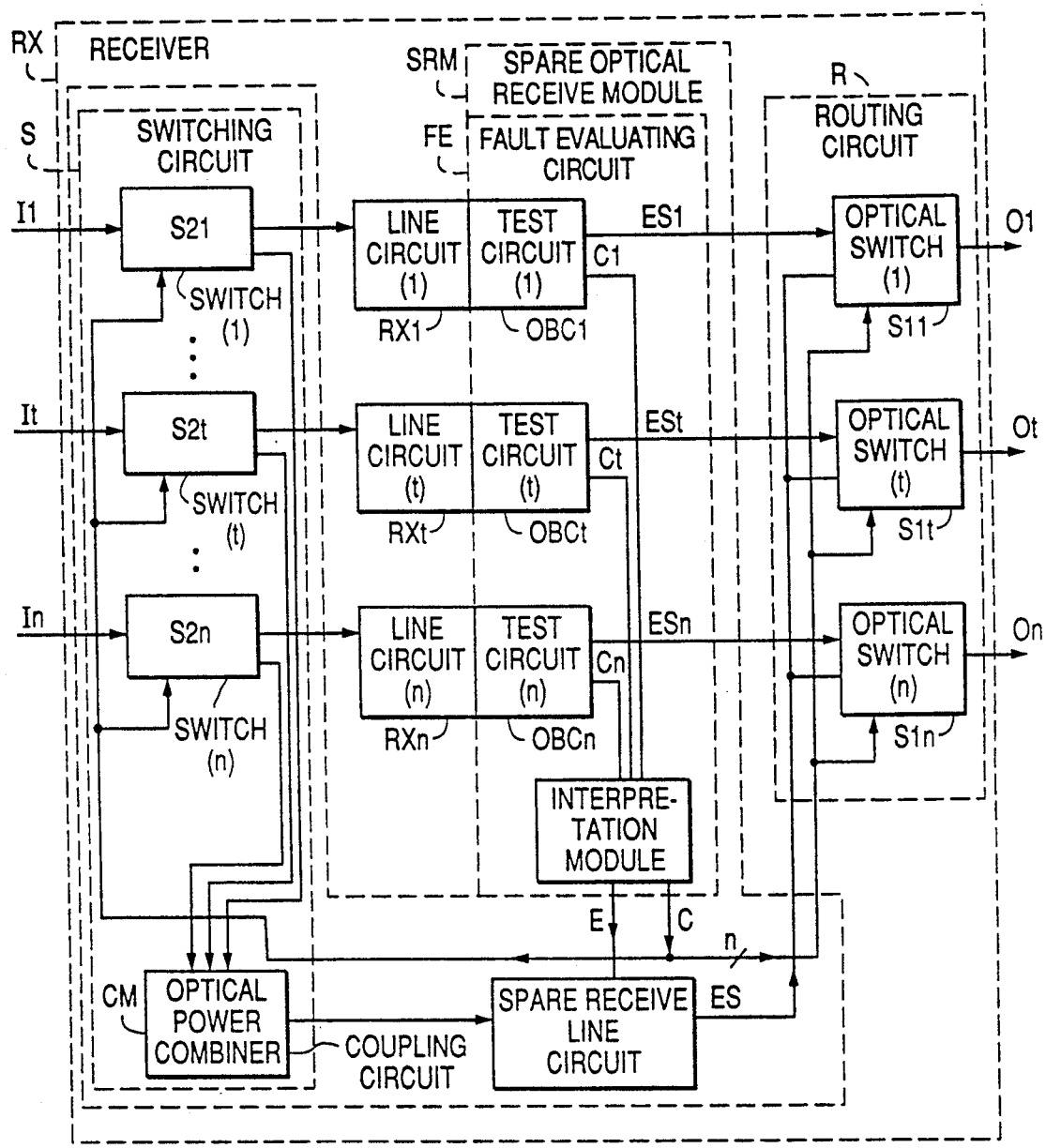

Another embodiment of a protection arrangement, for an optical receiver device, according to the invention is shown in FIG. 8. This embodiment differs from the one represented in FIG. 7 and described above in that the switching circuit S is constituted by n 1-to-2 switches S21/S2n to whose inputs the input signals I1/In are applied, and by a coupling circuit CM. The switches have first outputs connected to respective ones of the n optical receive line circuits RX1/RXn and second outputs connected to respective inputs of the coupling circuit CM. The circuit CM is constituted by an n-to-1 optical power combiner OPC whose output is connected to the input of the spare receive line circuit SRC. These n 1-to-2 switches S21/S2n are controlled by respective bits of the control signal C in such a way that when, e.g., the optical receive line circuit RXi is defective, the 1-to-2 switch S2i applies its input signal Ii to its second output connected to the spare receive line circuit via the optical power combiner OPC, whereas the other switches couple their input to the input of the associated optical receive line circuits. It should be noted that to reduce power losses, the passive n-to-1 optical power combiner may be replaced by an active n-to-1 switch controlled by the control signal C.

Figure 9:
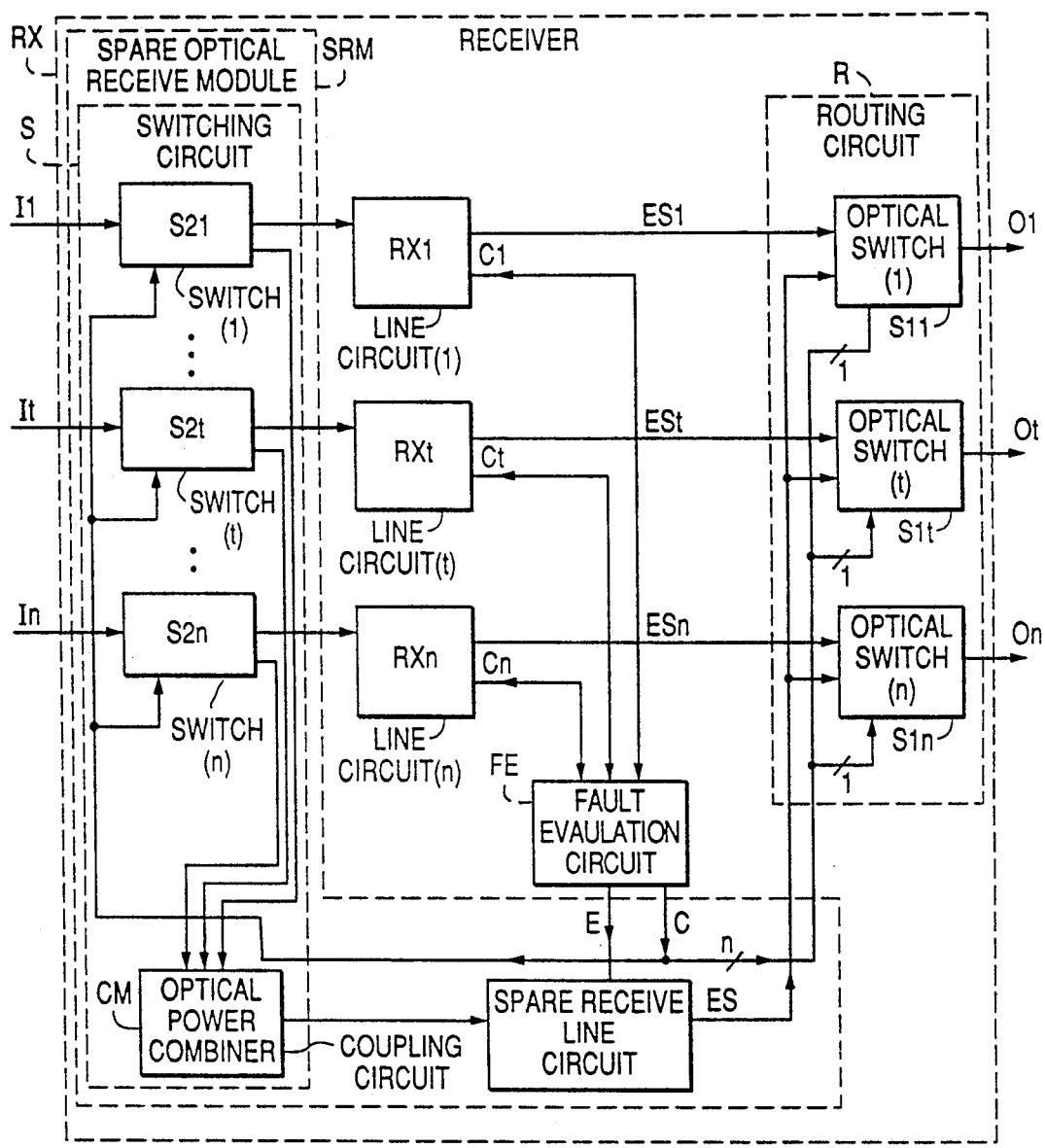

FIG. 9 represents yet another embodiment of a protection arrangement for an optical receiver device which is similar to the one described above with relation to FIG. 8, but wherein the fault evaluating circuit FE is not part of the optical receive line circuits RX1/RXn. How this modification is realized, is already described earlier in connection with the embodiment shown in FIG. 6.

It should be noted that an additional advantage of the different embodiments of the protection arrangement described above is that they may use passive optical elements, such as optical power combiners, wavelength multiplexers/demultiplexers, and splitters, which makes the arrangement more reliable than protection arrangements with active elements, data format and transmission rate independent, and immune to electromagnetic noise.

While the principles of the invention have been described above in connection with specific embodiments of the apparatus, it is to be clearly understood that this description is made only by way of example and not as a limitation on the scope of the invention.

We claim:

1. A protection arrangement for an optical transmitter device having n optical transmitter circuits whose outputs are operatively coupled to respective output terminals of the transmitter device, said protection arrangement including:

a spare optical transmit module operatively connected to inputs of each of said optical transmitter circuits and having an output on which, if any one of said optical transmitter circuits is defective, an optical output signal characteristic of that defective optical transmitter circuit is produced, said optical output signal carrying the same information as carried by an input signal applied to an input of said defective optical transmitter circuit; and routing means, operatively connected to the outputs of said optical transmitter circuits and to the output of said spare transmit module, for providing said optical output signal from said spare optical transmit module at the respective output terminal to which the output of said defective optical transmitter circuit is operatively coupled;

wherein said spare optical transmit module includes:

switching means having n inputs operatively connected to respective inputs of said optical transmitter circuits, for switching an input signal associated with said defective optical transmitter circuit to an output of said switching means;

fault evaluating means, operatively connected to said optical transmitter circuits and having an output on which a first control signal indicative of said defective optical transmitter circuit is produced, said first control signal controlling said switching means so that said switching means provides at the output thereof said input signal associated with said defective transmitter circuit; and a spare transmit circuit which is operatively connected to receive the output of said switching means and generate said optical output signal at an output thereof.

2. A protection arrangement according to claim 1 wherein said routing means comprises:

an n port wavelength demultiplexer, having an input operatively connected to the output of said spare transmit circuit, and a plurality of outputs;

wherein said spare transmit circuit is tunable and is tuned by a second control signal produced by said fault evaluating means to produce said optical output signal with a wavelength characteristic of said defective optical transmitter circuit; and wherein said routing means further comprises:

n 2-by-1 optical power combiners having first inputs operatively connected to respective outputs of said n optical transmitter circuits and having second inputs operatively connected to respective outputs of said n-ports wavelength demultiplexer, the outputs of said combiners being said output terminals of the transmitter device.

3. A protection arrangement according to claim 1 wherein said routing means includes:

n 2-to-1 optical power combiners having first inputs operatively connected to respective outputs of said n optical transmitter circuits; and a 1-to-n switch for switching the output of said spare optical transmit circuit to a second input of the 2-to-1 optical power combiner operatively connected to said defective optical transmitter circuit, said 1-to-n switch being controlled by said first control signal.

4. A protection arrangement according to claim 1, wherein said routing means includes:

n 2-to-1 switches each having a first input, a second input and an output, the first inputs being operatively connected to respective optical transmitter circuits; and a 1-to-n optical splitter for coupling the output of said spare optical transmit circuit to the second inputs of said n 2-to-1 switches, each of said n 2-to-1 switches being controlled by said control signal to switch their output to said second input if the respective optical transmitter circuit operatively connected to said first input is defective.

5. A protection arrangement according to claim 1, wherein said fault evaluating means includes:

n test circuits, each being integrally formed as part of a respective one of said optical transmitter circuits, for testing the operation of said optical transmitter circuits and for providing respective test result signals on outputs thereof; and an interpretation module, having n inputs operatively connected to the respective outputs of said test circuits, and having an output on which said first control signal is provided.

6. A protection arrangement according to claim 1, wherein said fault evaluating means comprises a fault evaluating circuit, having n inputs and outputs operatively connected to respective optical transmitter circuits, for testing the operation of said optical transmitter circuits, and having an output at which said first control signal is provided.

7. A protection arrangement for an optical receiver device having n optical receive circuits whose outputs are operatively coupled to respective ones of n output terminals of said optical receiver device, said protection arrangement including:

a spare optical receive module, having n inputs operatively coupled to respective inputs of said optical receiver device, said spare optical receive module cooperating with said n optical receive circuits, and having an output at which, if any one of said optical receive circuits is defective, an electrical signal characteristic of that defective optical receive circuit is produced, said electrical signal carrying the same information as carried by an input signal applied to an input of said defective optical receive circuit; and routing means, operatively connected to the outputs of said optical receive circuits and to the output of said spare optical receive module, for providing said electrical signal from said spare optical receive module at the respective output terminal to which the output of said defective optical receive circuit is operatively connected;

wherein said spare optical receive module includes:

switching means, having n inputs constituting respective input terminals of the receiver device, n outputs operatively connected to respective inputs of said n optical receive circuits, and a further output for providing at least said input signal applied to said defective optical receive circuit;

fault evaluating means, operatively connected to said n optical receive circuits, for producing a first control signal indicative of said defective optical receive circuit, said first control signal controlling said routing means; and a spare receive circuit, operatively connected to the further output of said switching means, for generating said electrical signal at an output thereof in response to said input signal applied to said defective optical receive circuit.

8. A protection arrangement according to claim 7, wherein said routing means includes n 2-to-1 switches each having an output operatively connected to a respective one of said output terminals, each having a first input operatively connected to the output of a respective one of said optical receive circuits, and each having a second input operatively connected to the output of said spare optical receive module, said n 2-to-1 switches being controlled by said first control signal.

9. A protection arrangement according to claim 7, wherein said switching means comprises:

n optical splitters each receiving a respective one of n received input signals, and each having a first output operatively connected to an input of a respective one of said optical receive circuits; and an optical power combiner, having n inputs each of which is operatively connected to a respective second output of said optical splitters, for producing at an output thereof, a combination of said n received input signals;

wherein said optical receive circuits are coherent optical receive circuits and said spare optical receive circuit is tunable and is tuned by a second control signal produced by said fault evaluating means to select from said combination of n received input signals, said input signal applied to the input of said defective optical receive circuit.

10. A protection arrangement according to claim 7, wherein said switching means includes:

n 1-to-2 switches having respective first and second outputs, the first outputs being operatively connected to respective inputs of said optical receive circuits; and optical coupling means for coupling the second outputs of said n 1-to-2 switches to the input of said spare optical receive circuit, said n 1-to-2 switches being controlled by said first control signal to switch to said second output if the optical receive circuit operatively connected to said first output is defective.

11. A protection arrangement according to claim 7, wherein said fault evaluating means includes:
n test circuits, each being integrally formed as part of a respective one of said optical receive circuits, for testing the operation of the optical receive circuits, and for providing corresponding test result signals on respective outputs thereof; and an interpretation module, having n inputs operatively connected to respective outputs of said test circuits, for providing at an output thereof, said first control signal.

12. A protection arrangement according to claim 7, wherein said fault evaluating means comprises a fault evaluating circuit having n inputs and outputs operatively connected to respective optical receive circuits, for testing the operation of the optical receive circuits, said fault evaluating circuit providing at an output thereof, said first control signal.

* * * * *